US010286969B2

(12) United States Patent
Srabstein (10) Patent No.: US 10,286,969 B2
(45) Date of Patent: May 14, 2019

(54) EXTENSIBLE FRONTAL ROOF FOR A MOTORCYCLE (71) Applicant: Amadeo José Srabstein, Buenos Aires (AR)

(72) Inventor: Amadeo José Srabstein, Buenos Aires (AR)

(*) Notice: Subject to any disclaimer, the term of this patent is extended or adjusted under 35 U.S.C. 154(b) by 0 days.

(21) Appl. No.: 13/866,533

(22) Filed: Apr. 19, 2013

(65) Prior Publication Data
US 2014/0312644 A1 Oct. 23, 2014

(51) Int. Cl.
B62J 17/08 (2006.01)
B62J 17/04 (2006.01)

(52) U.S. Cl.
CPC ............... B62J 17/08 (2013.01); B62J 17/04 (2013.01)

(58) Field of Classification Search
CPC ............ B62J 17/00; B62J 17/04; B62J 17/02
USPC ........................................ 296/77.1, 78.1, 89
See application file for complete search history.

(56) References Cited

U.S. PATENT DOCUMENTS 4,355,838 A * 10/1982 Hickman ................. 296/78.1
5,857,727 A * 1/1999 Vetter .................... 296/78.1

FOREIGN PATENT DOCUMENTS

GB         2218060 A * 11/1989

* cited by examiner

Primary Examiner — D Glenn Dayoan
Assistant Examiner — Melissa A Black
(74) Attorney, Agent, or Firm — Egbert, McDaniel & Swartz, PLLC (57) ABSTRACT An extensible roof for vehicles such as scooter-type motorcycles is provided. The extensible roof protects the passengers of the vehicle from the inclement climate and is able to be retreated in the front part of the vehicle and to be opened in the case of rain, snow or at the passenger's will, covering him/them totally from said inclement climate by means of the surface formed by different plates of roof linked to each other through a sliding system. The proposed roof is of the type comprising a mobile transparent covering panel, slidable in an upward and downward direction characterized in that when folded, the higher border of said at least one covering panel is below the handlebar of the motorcycle.

10 Claims, 6 Drawing Sheets

EXTENSIBLE FRONTAL ROOF FOR A MOTORCYCLE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention is related to the field of protecting devices used in motor vehicles without a body shell and it is based on an integral system which forms a roof for vehicles such as scooters and motorcycles, with the purpose of protecting the vehicle passenger from the inclement climate, with the qualities of being extensible and being able to remain folded small at the frontal part of the vehicle to be opened in rainy, snowy weather or at discretion of the passenger/s, being able to cover them in frontal and upper zones before said inclement climate. The Extensible Frontal Roof is used being located in the structural front of the vehicle without interfering with the driver's driving sight, placed below the line at the height of the handlebar by various fastening systems, fixed and/or removable, which let them be used in various vehicle models, such as the above mentioned. The main feature of the Extensible Frontal Roof is that its surface is comprised of different sheets linked between each other by binding fastening systems, which remain retracted and stacked in the frontal part of the vehicle in its closed position, with binding supports which connect it with the vehicle and take it to a raised position when being used, from where the roof will be unfolded in a semicircular way, taking upwards and backward the general surface, comprising a cover which provides protection to the driver in a front part and an upper part of its travel, so that the purpose described by this invention could have a sense in a unfavorable weather. The present Invention is described for its main use in motorcycles, more precisely scooters, preferably being implemented opposite the frontal surface of the structural body shell of said vehicles, and said Extensible Frontal Roofs could be generated with various supporting systems and/or materials, which in its manufacturing, will be adapted to different vehicle models.

2. Description of Related Art Including Information Disclosed Under 37 CFR 1.97 and 37 CFR 1.98

A multiplicity of alternatives of structural protection against inclement climate are known for motor vehicles without a body shell, among which we can remark:

U.S. Pat. No. 27,713 A.D. 1910 discloses a complementary removable structure in bikes or similar, which when being assembled, achieve a protection structure which, along with an attached cover, can preserve the vehicle passenger from inclement climate and sun. The present invention is one of the first ones in providing a technical solution to the weather problem in vehicles without a body shell, however, a system which can remain placed in the vehicle and folded back in its frontal part, extensible and usable at will results in a new invention which deserves to be developed.

U.S. Pat. No. 245,903 by Harris describes an integral protection structure for bicycles. It preserves the passenger entirely from rain and other inclement climate. However, it is shown with a technical development and an inventive system very different from that in the patent described herein. It does not show extensible qualities, so that the structure could reduce its size in the frontal part of the vehicle, reaching an open position for its correct functional use, being able to be applied and removed by the user at will in a practical installation and disassembly action.

U.S. Pat. No. 1,360,945 by W. S. Harley describes a complete and integral shield for the wing on to motorcycles. It discloses certain adaptability characteristics to various vehicle models, but it does not show adaptable and/or folding characteristics in its structure and, definitely, it is not referred to an extensible roof for motorcycles which is placed in a retreated position below the height of the handlebar, without interfering the driver's visual field.

U.S. Pat. No. 1,532,008 by R. S. Walford describes a screen for wind which applies to motorcycles. It discloses certain adaptability characteristics to the structure in various vehicles adding soft combinable materials with rigid supports, but it does not show adaptable and/or folding characteristics in its structure and, definitely, it is not referred to an extensible roof for motorcycles which is placed in a retreated position below the height of the handlebar, without interfering the driver's visual field.

U.S. Pat. No. 2,237,594 by F. L. Dunlap describes a shield for wind which applies to motorcycles. It discloses the condition of being foldable, but it does not show extensible and/or folding characteristics in its structure and, definitely, it is not referred to an extensible roof for motorcycles which is placed in a retreated position below the height of the handlebar, without interfering the driver's visual field.

U.S. Pat. No. 3,284,130 by V. E. Michael is proposed as a combination of a frontal shield for wind and an upper structure with the purpose of protecting the passengers in a vehicle without a body shell from inclement climate, defining a rigid structure with an upper sunshade, connected with the above mentioned windscreen, defining a single structure. Although the purpose of said invention are providing a detachable structure which adapts to different motorcycles models, the present invention does not have, among others, the extensible and/or folding characteristics in its structure which let it occupy a deployed position and another uncovered position, something very practical and necessary for its implementation and convenient use.

U.S. Pat. No. 4,045,077 by DeVone describes a structure for an integral protection for bicycles. It preserves al passenger entirely from rain and other inclement climate. It also has other inventive purposes, for example with the roof of the structure which being removed it is disclosed to be used as a table. However, it is shown as a technical development and an inventive system very different from that in the patent describes d herein. It does not show comfortable extensible qualities, so that the structure could reduce its size by over folding different stretches in its structure still being installed in the vehicle at the driver's will, and/or extend above his/her head upwards and backwards to achieve the positions which provides protection.

U.S. Pat. No. 4,440,436 by Giddens and Arnold describes an integral protection structure for motorcycles and the like. It preserves the passenger entirely form rain and other inclement climate. It also discloses qualities of being capable to be removed and folded on itself. However, it is shown as a technical development and an inventive system very different from that in the patent describes d herein. It shows some difficulties on providing the required place for the vehicle companion, restricting it to be used by only one person. Definitely, it is not referred to an extensible roof by slipping panels placed in its retreated position below the height of the handlebar, without interfering the driver's visual field.

U.S. Pat. No. 4,632,448 in the name of Yagasaki discloses the development of a particular two-wheeled vehicle, with a seat, and the particular propose of an joinable, removable and modular body sheet, different covering sheet forming a perimetral security structure. It is an invention meeting the functions required by the patent proposed herein but it shows a totally different technical way of solution, since it does not disclose extensible or folding conditions in its structure, letting it modify its shape to go from an open position to a closing position.

U.S. Pat. No. 4,778,214 by Fu describes a protector shield for adverse climate conditions comprising a vertical and straight front, and horizontal roof and a back support, also straight and vertical. This invention describes a rigid and static structure functions as protection in inclement climate but the present invention is not capable of, among others, adapting or modifying its structural shape being allowed to occupy a deployed position and another uncovered position, something very practical and necessary for implementing and convenient use.

U.S. Pat. No. 4,973,082 by Kincheloe describes a protection cage against crashes. The function to be claimed is strictly safety. It suggests an attached closing which could act as safe in adverse climate conditions, but it is briefly describes d and without variable conditions or adaptable to its shape. It does not have any of the qualities describes d in the present invention and, definitely, it is not referred to an extensible roof for vehicles without a body sheet.

U.S. Pat. No. 5,072,987 in the name of Allen describes an integral protection structure for motorcycles and the like. It preserves the passenger entirely from rain and other inclement climate. It also discloses qualities of being capable to be removed and folded on itself. However, it is shown as a technical development and an inventive system very different from that in the patent describes d herein, formed by different panels connected in an over folded way among them, being extensible by slipping systems and, definitely, it is not referred to an extensible roof by slipping panels placed in its retreated position below the height of the handlebar, without interfering the driver's visual field.

U.S. Pat. No. 5,458,390 in the name of Gilbert discloses a structure for motorcycles and the like formed with a modular bar system and surfaces covering the perimeter until the whole vehicle is covered. It has functions related to protection against inclement climate like rain or snow and unfavorable climate conditions, but it is not referred to a roof with removable characteristics, which being installed in the front part of the vehicle shows extensible conditions being capable to increase its size and deploy to an upper and back part of the vehicle defining a practical and comfortable roof for a use in an intermittent way.

U.S. Pat. No. 5,791,718 in the name of Boutin describes a tubular structure with sticks supporting a whole cover, designed to preserve the passengers from adverse climate conditions. It is not conceived as an structure with the characteristic of being capable to spread out to a covered position and retreat to a closed position alternately by surfaces connected between each other and slipping.

U.S. Pat. No. 5,904,392 in the name of Mainwal proposes a rigid shield to provide perimetral safety to motorcycles drivers and the like. It preserves passengers from adverse climate conditions and provides certain perimetral safety conditions. Due to the rigid nature of the invention, it lacks of modular characteristics, adaptable and/or extensible, not being capable to modify its size and shape to reach a deployed and another retracted position.

U.S. Pat. No. 5,975,614 in the name of Mc Grue defines a structure for vehicles without body shell formed by four rising sticks and an upper surface. The structure is disclosed with removable characteristics, and being uninstalled from the vehicle, it is capable to retreat the sticks against the cover, so as to reduce its structural volume, however it is not capable to modify its general size once installed from an open position to a closed position, allowing the driver to use the structure according to climate needs and his/her preferences. Definitely, it is not referred to a roof with extensible characteristics.

U.S. Pat. No. 6,010,173 by Chyan-Luen discloses an external structure too motor vehicles without body shell as a shield against the sun and against the sun and adverse climate conditions. It has a removable cover tarpaulin, but regarding its structure, it can be noticed that is excessively big and consequently heavy. Due to the rigid nature of the invention it lacks of modular characteristics, adaptable and/or extensible and, definitely, it is not referred to an extensible roof for motorcycles placed in a retreated position below the height of the handlebar, without interfering the driver's visual field.

U.S. Pat. No. 6,142,253 by Mueller, Thoma and Theobald, describes a motorcycle having a continuation in its structural body shell defining a front part, a roof and a back in the vehicle. This structure cannot be compared to the nature of an extensible roof which is expected to adapt and modify its size from an opened position and a closed position placed in a retreated position below the height of the handlebar, without interfering the driver's visual field.

U.S. Pat. No. 6,231,104 by Roethel describes a shield against the wind applying to motorcycles. It suggests the characteristics of being removable to the vehicle, but it does not have characteristics adaptable in its structure and, definitely, it is not referred to an extensible roof for motorcycles placed in a retreated position below the height of the handlebar, without interfering the driver's visual field.

U.S. Pat. No. 6,402,220 in the name of Allen describes a detachable roof for vehicles without body shell such as quadricycles formed by two lateral bow-shaped bars and upper transversal bars, which are endorsed with an upper roof. It has functions related to protection against adverse climate such as rains and others but it is not referred to a roof with removable characteristics which when being installed in the front part of the vehicle, it shows extensible conditions being capable to modify its size and deploy to a back upper part of the vehicle defining a practical and comfortable for its intermittent use.

U.S. Pat. No. 6,598,927 in the name of Kurohori, Ozeki, Furuta, Kobayashi, Takamoto, discloses an external structure to motor vehicles without body shell like a shield against the sun and adverse climate conditions. Due to the rigid nature of the invention it lacks of modular characteristics, adaptable and/or extensible, not being capable to modify its size and shape to achieve convenient positions of unfolded and retreated.

U.S. Pat. No. 6,764,099 by Akiyama, Nakamura, Itabashi and Iijima describes a motorcycle having a continuation of its structural body shell defining a front, a roof and a back in the vehicle. This structural model cannot compare to the nature of a detachable "Roof" and attached to a vehicle, resides that it does not have adjustable or foldable conditions in its shape and it does not disclose any other supporting characteristics which define the present invention. Definitely it is not referred to an extensible roof placed in a retreated position below the height of the handlebar, without interfering the driver's visual field.

US Patent Publication No. 2003/0041890 A1 describes a modular structure of interconnected tubes to form a supporting structure of a roof for vehicles without body shell like scooters, with the purpose of protecting the passenger from rain and adverse climate conditions. The system does not disclose clear conditions of adaptability to various models, it does not disclose suitable connecting adaptable modules and it does not seem to have any effectiveness or simplicity when installing and uninstalling vehicle structure. Definitely it is not referred to a deployed roof from the front part of a vehicle to an upper and back part thereof, being capable to be installed and uninstalled in an extensible way at will.

US Patent Publication No. 2008/0048413 A1 describes a detachable roof for bicycles suitable for use and structural universal characteristics, with a main structural frame and a complementary cover, and although it protects drivers of vehicles without a roof from adverse climate conditions, it does not have deployable and/or extensible qualities in its structure, without any ability of being installed and removed at will during the route by extensible systems.

The Dutch patent 189520 describes a frontal shield for motorcycles connected in the handlebars of the vehicle and it unfolds upwards showing a stretch of frontal protection in a vertical direction and a second stretch of higher protection. It functions as a protection to the passenger/s from inclement climate. It describes in its graphics a shape which is similar to the Extensible Frontal Roof, sin embargo it is not referred to un extensible roof for vehicles without body shell placed in its in its retreated position under the height of the handlebar of the vehicle, without interfering the driver's visual field, giving the passenger the chance of using it in an unfolded position and in a retreated position, alternating its use conveniently.

Patent DE 10324435 A1 disclosed by Hensel Frank describes a frontal windshield for vehicles with the characteristics of having at least a stretch of a cover surface superimposed with another one with extensible qualities, being capable to be extended in unfavorable climate conditions and to provide a bigger frontal protection, however, said invention describes un system which cannot be removed from the front of the driver's visual field, therefore, the stretches of the cover surface superimposed one on another will darken the driver's vision reducing his/her visual range. This situation is avoided with the present invention of the Frontal Extensible Roof, which not being used is retreated in a superimpose way on the structural front of the vehicle, without affecting the driver's vision. Another essential characteristic in which both structure differ is that the Extensible Frontal Roof neither modifies the vehicle shape nor causes a permanent structural presence as an attached complement in the front of it when not being in a use position, without forcing the driver to use an upper frontal shield or windshield if it is not desired.

Patent DE 19629879 A1 refers to the above mentioned U.S. Pat. No. 6,142,253.

Patent DE 1710216 U describes an upper structure for bikes which provides general safety. Even though it can function as a protection against adverse climate it neither discloses detachable characteristics nor shows any capacity of being foldable and/or extensible, placed in a retreated position below the height of the handlebar, without interfering the driver's visual field.

Patent DE 19537937 describes a roof for motorcycles suitable for use and structural universal characteristics, with a main structural frame formed by two surrounding lateral sticks and a complementary cover, and although it protects drivers of vehicles without a roof from adverse climate conditions, it does not have deployable and/or extensible qualities in its structure.

Patent DE 1960 5071 A1 describes a covering device. The curve roof is connected with two sticks which support and they are linked with a module through which they slide in circumference extending the roof and taking it forwards and backwards to have it in an uncovered position. Although it could be considered closer to an extensible characteristic or folding due to the ability of the structure to modify its position, said system differs basically from the present invention, since it is referred to slipping surfaces with an opened position and another closed position with a base on two lateral axis and rotors, and not in a system of modular surfaces connected between each other with abilities to extend one sheet on another, in a lineal and continuous way placed in a frontal position of the vehicle.

Patent DE 19748807 A1 describes a roof for bicycles which discloses different ways of solution and ways where one of its characteristics is being able to retreat in three stretches and remain connected to the vehicle even not being unfolded. It functions as a protection to the passengers form inclement climate and it remains retreated in the back part of the vehicle when being dismantled, but definitely it makes it with a different technique and it is not referred to a roof with extensible characteristics placed in a retreated position below the height of the handlebar, without interfering the driver's visual field.

Patent DE 10 2004 010 049 A1 describes a particular frontal windshield for vehicles without body shell which protects the driver from inclement climate and sun. It has the ability of assembling and subjecting en a removable way, but the present invention is subjected to a front position and folds and it is unfolded for its convenient use and at the driver's will, in a more practical and useful way of being uninstalled.

Patent DE 20 2007 002 826 U1 describes an integral protection cabin for bicycles. Even though it functions as a protection to the vehicle passenger/s from rain, it neither disclose any removable characteristics nor discloses with the chance of being extensible and/or retractable and it is not placed in a retreated position below the height of the vehicle handlebar, without interfering the driver and/or companions' visual field.

Patent 2 335 821 of Spanish Patent and Trademark Office by Patrick Tonnelier describes a covering modular device for motorcycles and the like. The cabin is comprised of a group of continuous slipping panels from the front and back of the vehicle, connected by two lateral linked by two pivoting axes, completing a totally covered surface in its closed position. Although it could be considered closer to a foldable characteristic due to the ability of the structure to open and close, said system basically differs from the present invention, since it is referred to slipping extensible surfaces by the action of dos pivotal axes, and not by the action of the continuous slipping of the sheets. With the lateral axis that the structure needs to pivot it becomes so heavy, with a complicated body shell which partially impedes maneuverability and vision, comprising an excessive protection cabin to preserve passengers from adverse climate, not very practical and heavy.

Patent DE 198 34 186 A1 refers to the below described invention herein with register JP11049065A.

Patent 2 649 064 of Nacional Institute of Industrial Property in Paris, in the name of Sovanna, describes an integral vehicle with an outer characteristics comprising an integral safety structure for the vehicle passengers which also protects from adverse climate conditions. Although it discloses the condition of being folding or "convertible" from an opened position at the back part of the vehicle to the front part, it is solved by two pivotal lateral axis, reducing maneuverability and extending the lateral edge of the body shell. It is not referred to a light and practical structure and the slipping way differs from the present invention formed by various layers which extensible extend slipping in continuous axis over itself placed in a retreated position below the height of the vehicle handlebar, without interfering the driver and/or companions' visual field.

Patent FR 2768389 A1 describes a removable structure to provide a structural safety protection in motorcycles from a structure extending from a back part of the vehicle to a front part. Its design makes it specifically useful for the vehicle model which is disclosed in the invention, with precise and coincident dimensions between the cover roof and the body shell of the vehicle, therefore, does not refer to an adaptable and removable structure, comprised of extensible slipping panels by slipping links placed in a retreated position below the height of the vehicle handlebar, without interfering the driver and/or companions' visual field.

Patent FR 2769281 describes a vehicle frontal structure with the characteristic of having at least a stretch of a cover surface over folded with another stretch with extensible qualities, being capable to extend in unfavorable climate conditions and to provide a bigger frontal protection, however, said invention describes a system which cannot be removed from an important part of the front of the driver's visual field, therefore, the stretches in the cover surface over folded one on another will darken the driver's vision reducing his/her visual range. This situation is avoided with the present invention of an Extensible Frontal Roof, when not being in use it is retreated in a over folded way on the structural front of the vehicle, without affecting the driver's vision. Another essential characteristic in which both structures differ is that the Extensible Frontal Roof neither modifies the vehicle shape, nor causes a permanent structural presence as an annexed complement en its front when not being in a use position, without forcing the driver to use a superior frontal shield if not desired, or windshield or a structure abutting to the front part modifying the aspect of the vehicle producing a not very dynamic and obtuse structural load.

Patent WO 2007/129193 A1 by Tonnelier has been previously mentioned with the Patent register 2 649 064 of Nacional Institute of Industrial Property in Paris.

Patent JP11049065A describes a detailed and ingenious device designed to protect the passenger in motorcycles and the like from rain, with a careful technical treatment which allows it to be retreated and kept under the vehicle seat and/or place erected to extend its front o stretch of the roof to complete its deployed position and to form the roof. The development of this patent is excellent, and although it also se shows as a structure which extends from the back part of the vehicle to a front part of the vehicle, it differs from the technical embodiment described herein, while it does not disclose as a frontal implementation unit with abilities of extending and retreating by sheets over folded on each other by a slipping system for its practical and comfortable installation and uninstallation, placed in a retreated position below the height of the vehicle handlebar, without interfering the driver and/or companions' visual field.

Patent JP2004330884 describes a detachable roof for bicycles suitable for use and structural universal characteristics, with a main structural frame and a complementary cover, and although it protects the drivers in vehicles without a roof from adverse climate conditions in a removable way, it does not have deployable and/or extensible qualities in its structure, without any abilities of being installed and removed during the route at will, placed in a retreated position below the height of the vehicle handlebar, without interfering the driver's visual field.

Patent JP200596719 describes un detachable roof for bicycles suitable for use and structural universal characteristics, with a main structural frame and a complementary cover, and although it protects the drivers in vehicles without a roof from adverse climate conditions in a removable way, it does not have deployable and/or extensible qualities in its structure, without any abilities of being installed and removed during the route at will, placed in a retreated position below the height of the vehicle handlebar, without interfering the driver's visual field.

Patent WO 2008 1012624 A2 describes an upper structure for bicycles which provides structural safety. Although it can function as a protection against adverse climate it neither discloses detachable characteristics not it has any abilities of being foldable and/or extensible, placed in a retreated position below the height of the vehicle handlebar, without interfering the driver's visual field.

Patent WO 2009/063311 A1 describes a partial roof covering the back upper surface of the bicycle passengers, with a back connector which supports it. It is inefficient to cover the front and the upper front part of the passenger, being it an essential area to Project the driver from rain and inclement climate which affect directly from these directions. Definitely it is not referred to a roof with extensible characteristics placed in the front of the vehicle, below the height of the vehicle handlebar, without interfering the driver's visual field in its retreated position.

Patent GB 743218 A by Joseph Bush describes a frontal structure of vehicles with the characteristic of having at least a stretch of a cover surface over folded with another one with extensible qualities, being capable to extend in unfavorable climate conditions and to provide a bigger frontal protection, however, said invention describes a system which cannot be removed from an important part of the front of the driver's visual field, therefore, the stretches of cover surface over folded one on another will give the driver's vision reducing his/her visual range. This situation is avoided with the present invention of an Extensible Frontal Roof, when not being in use it is retreated on the structural front of the vehicle, without affecting the driver's vision at all. Another essential characteristic in which both structures differ is that the Extensible Frontal Roof neither modifies the vehicle shape, nor causes a permanent structural presence as an annexed complement en its front when not being in use position, without forcing the driver, if not desired, to use a superior frontal shield, or windshield or a structure which abuts to the front modifying the vehicle shape producing a not very dynamic and obtuse structural load.

Patent GB 2241477A by John Preston defines a removable roof for motorcycles or the like. It is comprised by a general rigid structure connected in a front part and another back part of the vehicle. It keeps functional characteristics similar to the patent herein described, but it differs from it in that it does not disclose adaptable linking modules and it does not have structural mobility, in order to, by the extension and over folding of its component parts through the slipping linking and/or extensible systems, modifying its shape from an opened position to a closed position, depending on the climate conditions and at the driver's will.

Patent CZ 2264 U1 describes a bar structure placed at the sides of a motorcycle model to be raised in a rotating way and comprising a supporting structure for a tarpaulin. It is referred to an structure proposed to produce a roof which protects in adverse climate conditions like rain, snow, etc. Modifying its shape to be completed, however its system differs from the patent herein disclosed, with extensible characteristics from the front part of the vehicle, extending in a modular way to reach a complete opened position, spreading out over the passenger/s head, placed in the front of the vehicle, below the height of the vehicle handlebar, without interfering the driver's visual field.

There exist some motorcycles and vehicles models without body shell which at present include a higher protection system against adverse climate conditions, manufacturers of human powered vehicles with upper and lateral coverings, and some perimetral structural safety adaptations in this type of vehicles. Prototypes of vehicles with a covering structure and various images in the WEB have been also noticed, all of them describing this type of devices, which, however, still does not describe any of the characteristics in the system described by the present patent of Invention.

As shown, the prior art in the field of the invention for "Roofs for motorcycles and the like" is widely developed, with various model and proposals which, due to different convenient reasons for global vehicular traffic development, nowadays we are starting to appreciate in an incipient global market but with outlooks to achieve a wide development. Therefore and according to the current art, it is appropriate the creation of a new generation of light, ergonomic and practical "Frontal Extensible Roofs", which give the motorcycle driver the chance to retreat them practically and conveniently while not being in use and keep them unfolded in adverse climate conditions. Roofs with extensible characteristics which could be installed and removed at will easily and by various supporting systems, turning these types of vehicles into light types in options of main transport every time and in every big city in the world, contributing this way to urban free and a healthier traffic, favoring energy save and fuel consumption for encouraging the use of more ergonomic and sustainable vehicles and then cars.

BRIEF SUMMARY OF THE INVENTION

Therefore it is an object of the present invention to provide a roof for motor vehicles of the type scooter or motorcycles with a structural front, with the purpose of protecting the vehicle passengers from inclement climate, with movable characteristics in its structural shapes, so that said roof could be found retreated over itself in the front part of the vehicle, before the structural front of the body shell, without affecting the driver's front vision and without modifying the original shape of the vehicle, remaining said roof in its retreated position below the line in height delimited by the handlebars. This movable structure is formed by various over folded slipping panels, with a slightly circular shape, according to the shape of the structural front of the vehicle, which when deploying let it move upwards and backwards of the driver's head and/or companion. Said roof for vehicles without body shell can be a fixed part of the vehicle, permanently incorporated therein, subjected by structural connectors and by various fixing modules such as the mentioned afterwards, being able to remain in a folded position and unfolded position in these different ways, being on the vehicle.

This general structure incorporated in the front of the vehicles, is based on a cover roof conformed by various curve panels connected by connectors and rails which make them slide there between, form a retreated position in which they can fold, compacting in the front part of the vehicle in its closed position, without modifying the structural size and/or the basic shape of this type of vehicles. The general structure of the roof has the ability of raising through extensible vertical supports, placing the roof in a raised position from which its extensible panels are unfolded upwards and backwards, covering this way the front and the upper zone of the driver and companion, comprising once unfolded a semicircular structure which will go forwards to an back upper part of the vehicle over the passenger/s head/s, keeping firmly its extended position by various systems based on adjusting nuts, removable tongs, safety bolts and/or various ways of providing supporting and fasten the protection panels when being unfolded in a use position.

The "Extensible Frontal Roof" will be able to make its extension, elevation movements, and other modifications in its shape by manual or electrical and automatic mechanisms, depending on the model to be Developer and the manufacturer preferences.

The "Frontals Extensible Roofs" will be able to be used in combination with various and specific models of electric windscreen wiper, which will complement the present invention providing a bigger clarity and granting a higher clarity and visibility in cases of utility and for the preferred use.

Various safety characteristics will be able to be considered to be incorporated in the use in the invention, such as to protect the driver and/or his/her passengers in case of an accident by loosening from the vehicle at high speeds. Said characteristics will be recommended for its manufacturing, and they are described below as an example and description, in the formation of the "Roof" with soft and/or flexible materials, or in a cover with soft materials in its inside part, disposed in a strategic way to make contact with the passengers' body in case of collision. Another combined safety technique could be from the adding of seatbelts which fasten the passenger/s body/ies. A third technique mentioned as recommended is based on the addition of supporting systems to the structure of the "Extensible Frontal Roof" with the vehicle specially designed to connect both structures one with the other, with the sufficient sensitivity to eject in an automatic way in the case of implementation of an internal force, achieving the loosening of the roof of the vehicle in case of an accident in which the passenger/s body/ies are projected forward, taking the roof forwards and upwards in said event of ejection of the body from the vehicle, moderating the bump and decompressing the body in its closing to minimize the possible impacts. This extra safety mechanisms are mentioned as manufacturing complementary suggestions of the above mentioned characteristics of the invention, not relating to the original natural thereof.

BRIEF DESCRIPTION OF THE SEVERAL VIEWS OF THE DRAWINGS

For a better clarity and understanding of the object of the present invention, it has been illustrated in various figures, in which it has been disclosed to the invention in some of their preferred embodiments, all these as an example, wherein.

DETAILED DESCRIPTION OF THE INVENTION

In reference to the figures we can see that the invention consists of a new higher protection structure for vehicles without body shell, such as, for example, motorcycles of the type scooter, with the purpose of protecting the passenger/s from inclement climate. The first one comprises an unfoldable structure which passes with a bow shape from a front position of the vehicle to an upper and back position thereof, over the driver or drivers' heads with, at least two main translucent and curved surfaces.

Figure 1:
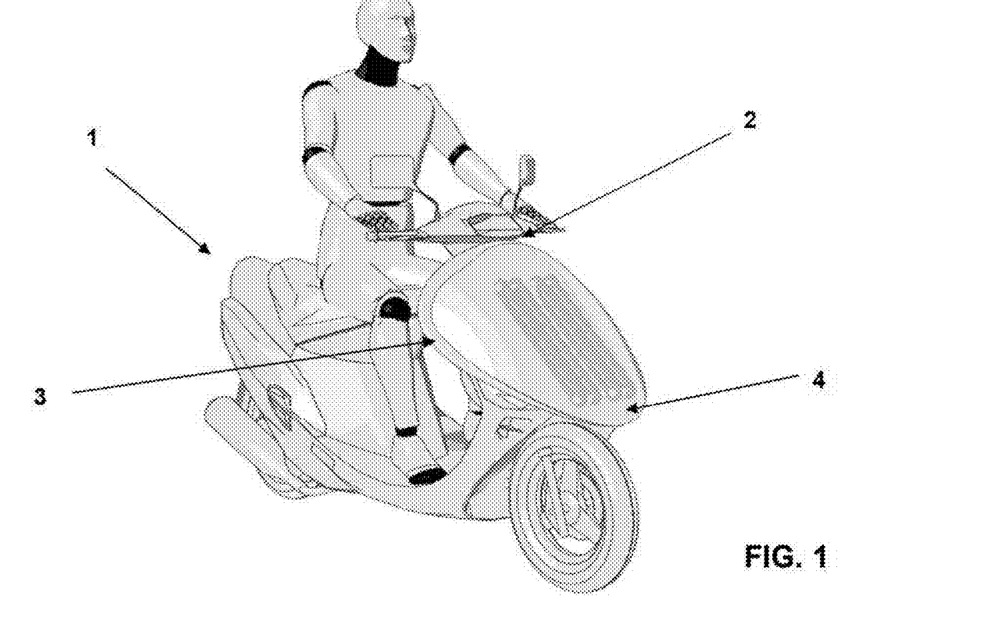
FIG. 1 is a perspective view of an Extensible Frontal Roof in a retreated position installed in the front of a motorcycle of the type scooter, according to an embodiment of the invention.

In FIG. 1 we can see a motorcycle of the type scooter 1, which has an unfoldable roof installed in the front part of the body shell structure 13 below handlebar 2, disclosing over the frontal part of the vehicle, at least a movable panel 4 which is a part of the deployable roof.

Figure 2:
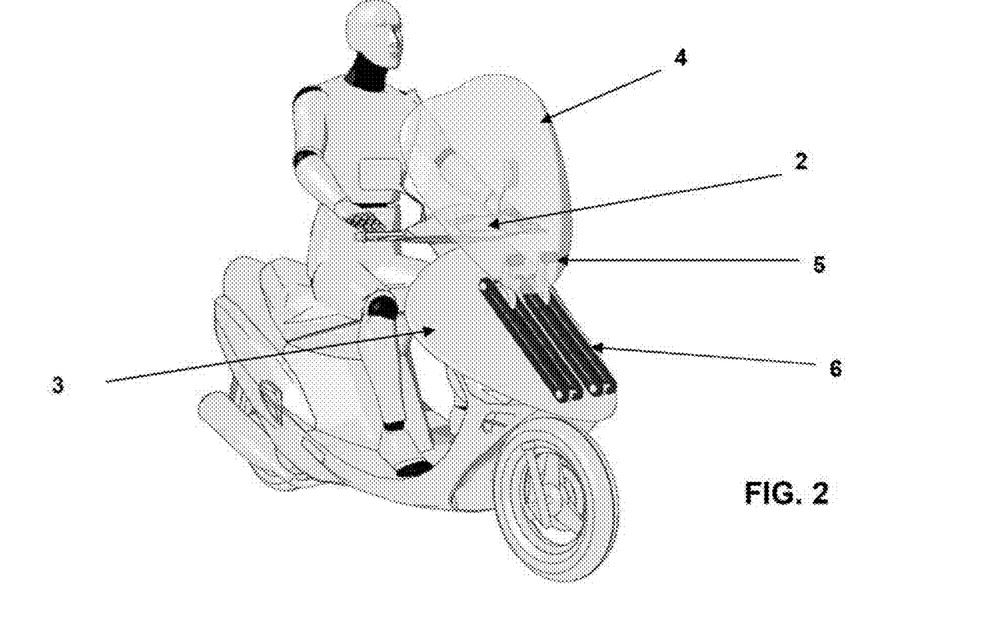
FIG. 2 is a perspective view of the same Extensible Frontal Roof in FIG. 1 taken to an upper position by slipping and extensible connectors, according to an embodiment of the invention.

In FIG. 2 we observe the motorcycle of the type scooter, with the movable panels 4 disposed at a raised use position, over folded one over the others, and forming the Extensible Frontal Roof, panels 4 that are supported by linking arms 5, which connect the lower stretch of one of the panels 4 with the front structure of the vehicle and they take it to a first front and superior position, from which the other panels will start to deploy the other panels below the front panel, providing the passengers of structural protection. In this preferred example of embodiment of the invention, said linking arms 5, are connected with the main structure of the vehicle by supporting mechanisms with movable characteristics which allow it move upwards and backwards through slipping rails 6. These linking arms 5 may be subjected to the vehicle in a fixed and/or removable way, they can disclose rotating characteristics in their ends, or be a structural part of the same extensible roof, depending on the model to be manufactured, considering that this one or any other exemplary way of subjection of the extensible roof will have to be installed in such way that it will not interfere with the handlebar spin or the front headlamp/s of the vehicle.

Figure 3:
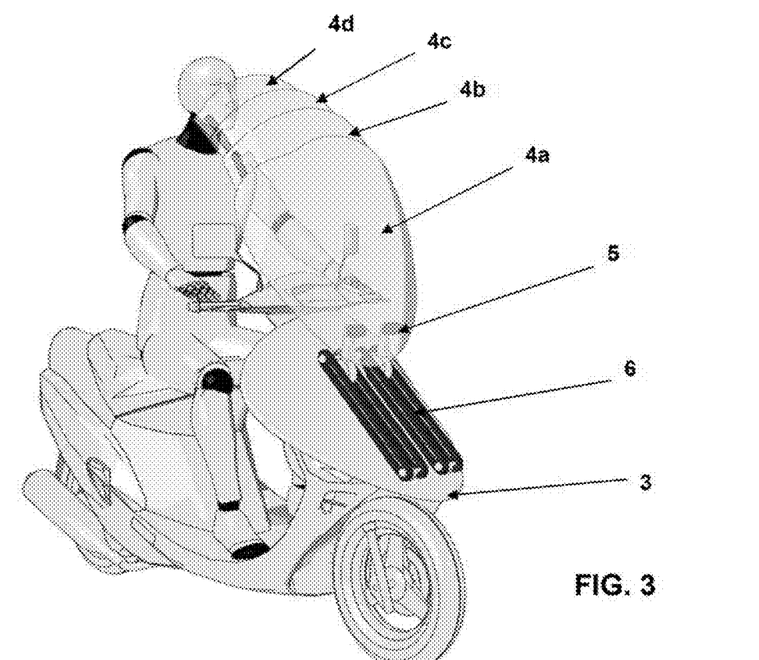
FIG. 3 is a perspective view of the same Extensible Frontal Roof in FIG. 1 initiating the extension process after being taken to an upper position, according to an embodiment of the invention.

FIG. 3 illustrates graphically how the Extensible Frontal Roof in its use position unfolds in an extensible way its protection panels 4a, 4b, 4c and 4d, connected together.

Figure 4:
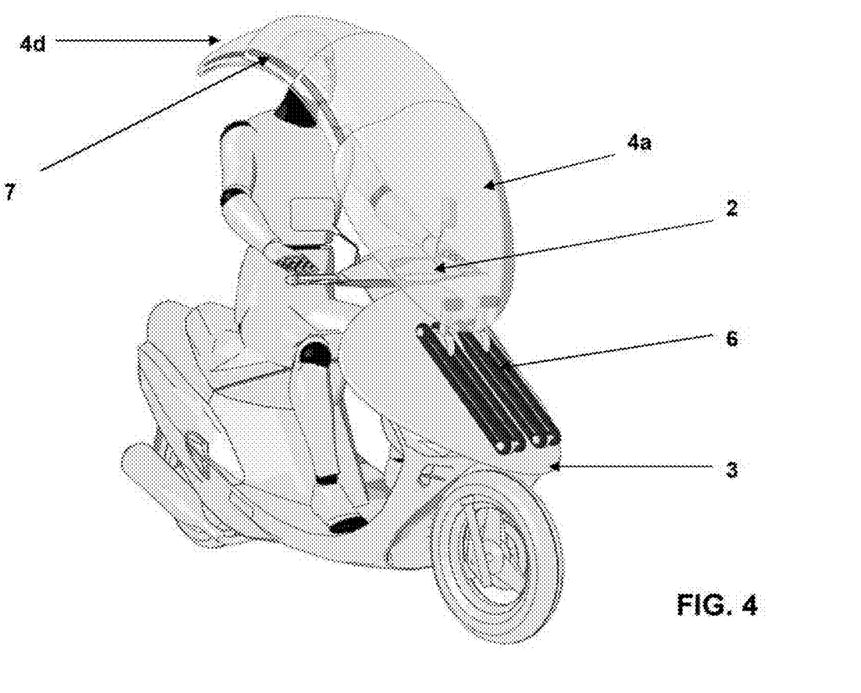
FIG. 4 is a perspective view of the same Extensible Frontal Roof in FIG. 1 completely unfolded after being taken to an upper position, according to an embodiment of the invention.

FIG. 4 shows how the Extensible Frontal Roof discloses its panels or translucent cover surfaces completely unfolded 4a-4d, providing the passenger of the vehicle and/or his/her companion from higher protection. The driver of the vehicle will remain sheltered from the inclement climate as well as he/she will be able to keep forwards visibility through the translucent unfolded panels.

Figure 5:
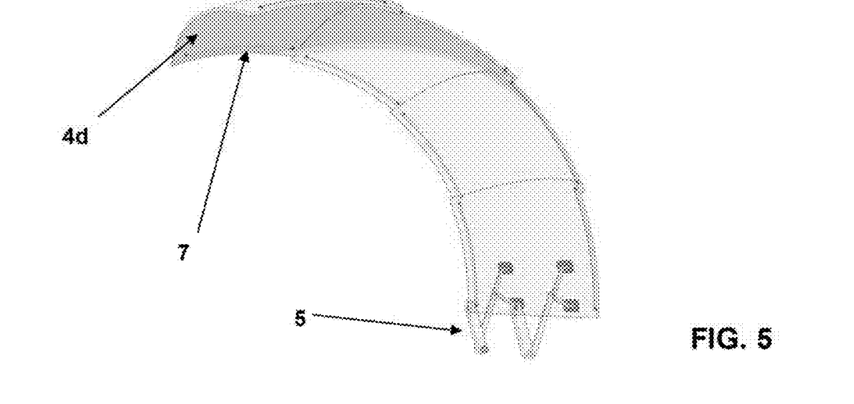
FIG. 5 is a perspective view of an unfolded Extensible Frontal Roof, according to an embodiment of the invention.
Figure 6:
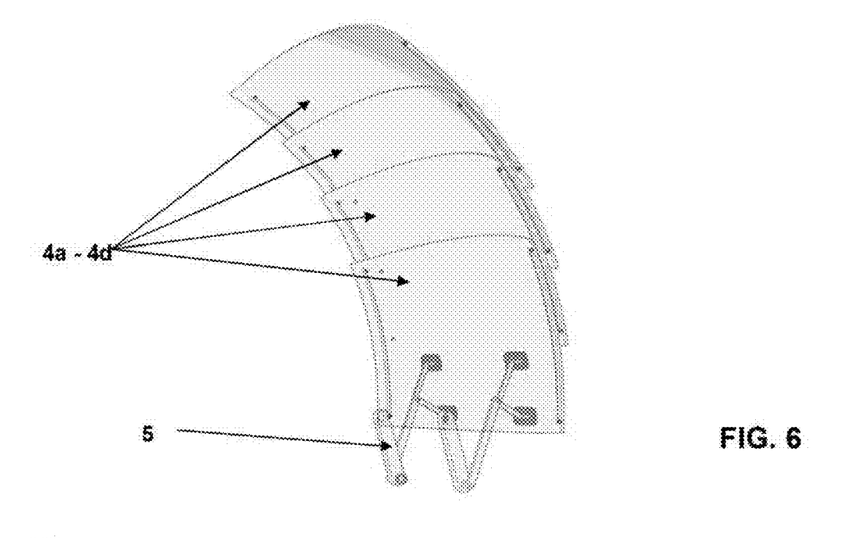
FIG. 6 is a perspective view of an Extensible Frontal Roof in an intermediate position, according to an embodiment of the invention.
Figure 7:
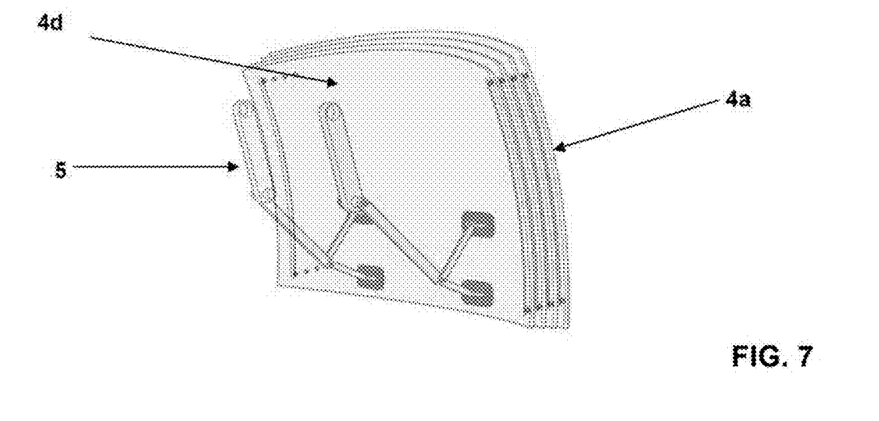
FIG. 7 is a perspective view of a retreated Extensible Frontal Root according to an embodiment of the invention.

FIGS. from 5 to 7 show one of the possible embodiments of the invention, which graphically illustrate a structural system from the type of the Extensible Frontal Roof displayed in the space and split of some vehicle in particular. Inside them the structure of the roof is first appreciated in an unfolded position, then in a semi-unfolded position, and finally in a retreated position. Observed are the slipping panels 4a-4d forming the general structure of the Roof, connected together by slipping lateral mechanisms 7.

According to the invention, it incorporates at least two axis, one in each one of the sides of the protection surfaces, connecting one panel with the other, providing slipping characteristics. Said axis will consist in integrator scabbard for the sides of the sheets, or in joins fit among modeled endings in the same cover sheets, and/or different mechanisms which achieve the connection of a sheet with the following and its continuous, slipping and parallel slipping.

Thus, it is formed an extensible system among the above mentioned protection surfaces or panels, capable to provide at least an extended or unfolded position and placed for its use and a retreated position with the protection panels stacked one over the other in the front part of the vehicle, connected thereto by linking extensions, in this example of the invention, disposed in pairs one in each side of the structure. They will be developed with various systems and ways, to adapt to various vehicle models and of extensible Roofs.

Figure 8:
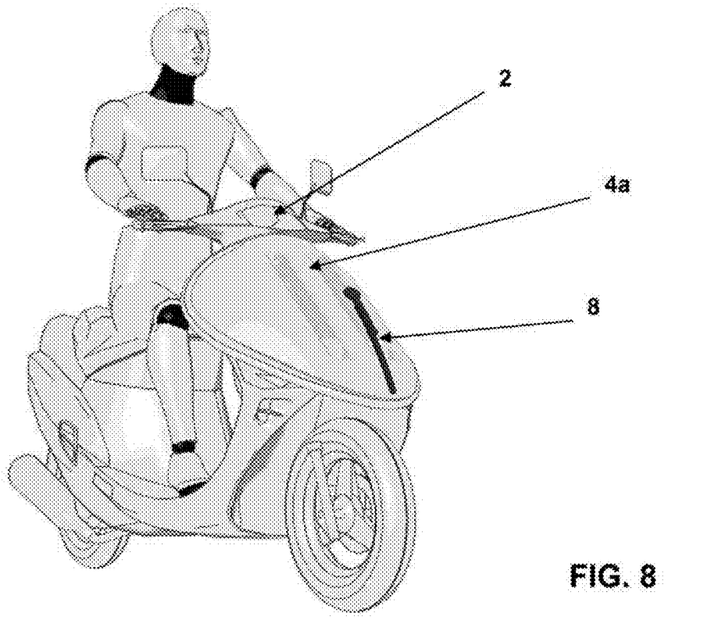
FIG. 8 is a perspective view of the same Extensible Frontal Roof in FIG. 1 in a retreated position which incorporates a device of the type of a windscreen wiper, according to an embodiment of the invention.

In FIG. 8 we can see the image in perspective of the same motorcycle of the type scooter in FIG. 1 which has an Extensible Frontal Roof installed in the front part of the structural body shell, adding a device from the type windscreen wiper 8 in the outer protection surface, which is displayed as an example in one of the possible uses to illustrate an hypothetical use of the present invention Developer with a device similar to the above mentioned one, with demonstrated abilities of improving and facilitating a proper visibility for the driver through the panels of the Extensible Frontal Roof in use conditions under the rain, snow or inclement climate from the type which can interfere with the continuous visibility.

Figure 9:
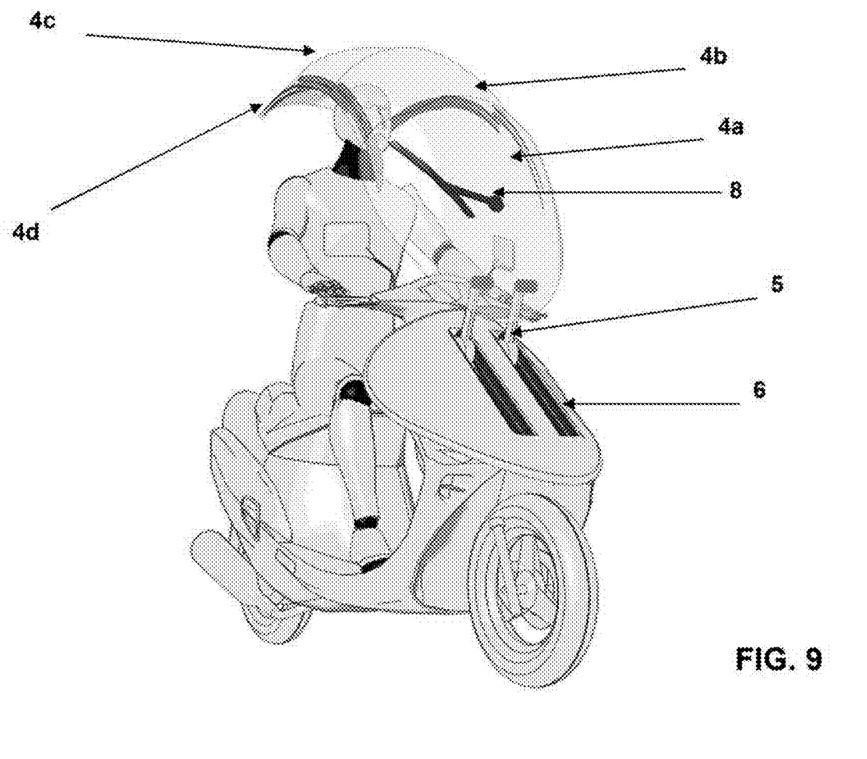
FIG. 9 is a perspective view of the same Extensible Frontal Roof in FIG. 1 in a completely unfolded position which incorporates a device of the type of a windscreen wiper in use position, according to an embodiment of the invention.

FIG. 9 displays the same above mentioned motorcycle of the type scooter, in which the Extensible Frontal Roof is seen completely unfolded, having a system form the type of a windscreen wiper therein 8, which has its use in the front sheet of the Roof 4a, according to an use example, having an effect on the driver's main visual field. Different ways of providing electricity and motor abilities to the windscreen wiper system could be exercised, according to various use models, not being taken into consideration in the present invention.

Figure 10:
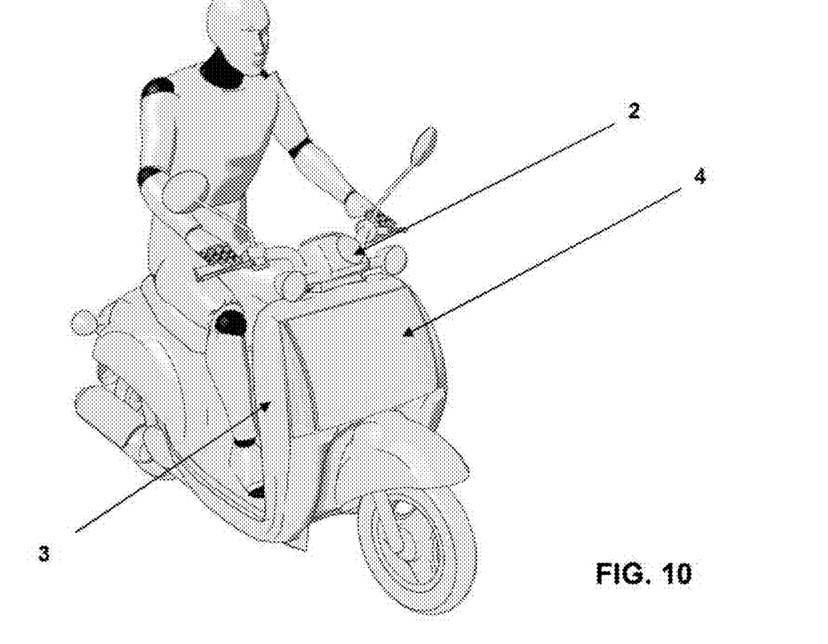
FIG. 10 is a perspective view de un Extensible Frontal Roof in a retreated position installed in the front of a motorcycle of the type Scooter with a front movable mud guard, according to an embodiment of the invention.

In FIG. 10 we can see an image in perspective of a motorcycle of the type scooter form the type which are Developer with mud guards and front wheels, which has a removable roof installed in its frontal part with its frontal panel 4a, with its upper edge below the handlebar in its folded position.

Figure 11:
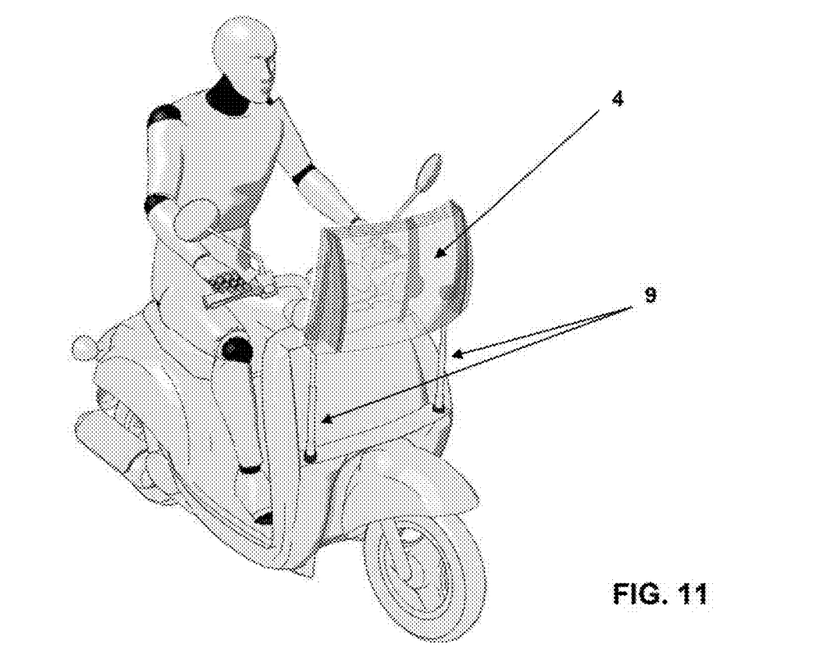
FIG. 11 is a perspective view of the same Extensible Frontal Roof in FIG. 10 taken to an upper position by extensible connectors, according to an embodiment of the invention.

In FIG. 11 we can see the same example in FIG. 9, with the over folded panels of the Extensible Frontal Roof disposed in its raised use position, which are supported by linking telescope axis 9, which connect the lower stretch inferior of the roof with the structure of the vehicle and take it to a frontal and upper position, from which it is deployed to provide the passengers with a protection structure 1. In this example of the invention, said linking axis disclose telescope extensible characteristics which let the main structure formed by the protection sheets of the Extensible Frontal Roof move upwards and downwards.

Figure 12:
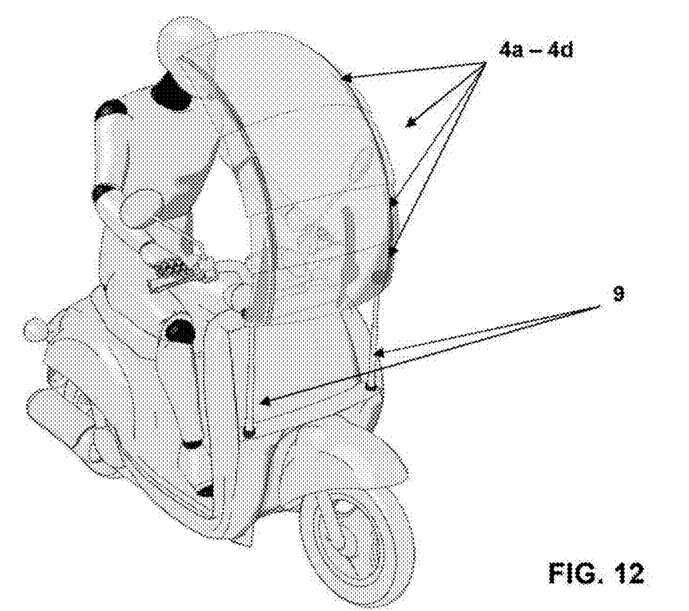
FIG. 12 is a perspective view of the same Extensible Frontal Roof in FIG. 10 initiating the extension process after being taken to an upper position, according to an embodiment of the invention.

FIG. 12 shows an image in perspective in FIG. 10 in which we can see how the protection panels of the Extensible Frontal Roof are almost completely unfolded. It can be appreciated that this use line of the Extensible Frontal Roof, referred to the one installed in motorcycles of the type scooter with the mud guard and the front sheet with spin, will usually give a smaller surface in the front of the vehicle to the sheets of the Extensible Frontal Roof to be gathered ones on the others in its retreated position, therefore a higher quantity of sheets will be needed to form the ideal protection surface in an extended position and use.

Figure 13:
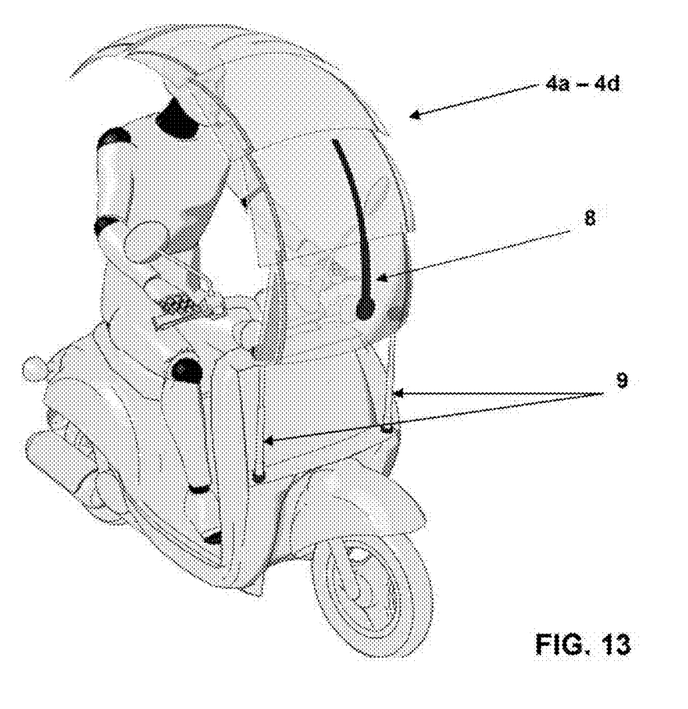
FIG. 13 is a perspective view of the same Extensible Frontal Roof in FIG. 10 in a completely unfolded position after being taken to an upper position, which incorporates a device of the type of a windscreen wiper, according to an embodiment of the invention.

In FIG. 13 we can see the motorcycle with panels 4a-4d of the Extensible Frontal Roof completely unfolded and in its use position. It is also observed a system form the type from the windscreen wiper 8 attached to the Extensible Frontal Roof form the lower protection sheet, useful in the area of the driver's vision, in another case that illustrates the ways of incorporating this type of devices, very convenient for its use in an Extensible Frontal Roof.

I claim:

1. A windscreen assembly wiper for a motorcycle, the windscreen assembly comprises:
   a main panel formed of a translucent material; and
   at least one supporting panel slidably mounted to said main panel, the supporting panel movable between a first position underlying said main panel and a second position extending outwardly and upwardly from said main panel, each of said main panel and the supporting panel being curved, an upper end of said main panel overlapping a lower end of the supporting panel when the supporting panel is in the second position; and
   at least one pair of operating arms each of which having a proximal end adapted to be movably connected to a frontal part of the motorcycle and a distal end connected to said main panel, said at least one pair of operating arms being slidably connected to respective guideways, the guideways adapted to be affixed to the frontal part of the motorcycle, said at least one pair of operating arms causing said main panel to a move to a folded position such that the upper end of the main panel is below a level of a handlebar of the motorcycle and move to an unfolded position in which the upper end of said main panel extends above the level of the handlebar in a rectilinear position generally parallel to the front part of the motorcycle.

2. The windscreen assembly of claim 1, wherein each of the pair of operating arms is an extensible arm.

3. The windscreen assembly of claim 2, wherein the extensible arm is a hydraulic cylinder.

4. The windscreen assembly of claim 2, wherein the extensible arm is an electrical actuated cylinder.

5. The windscreen assembly of claim 1, wherein the guideways comprise at least two linear guideways, the proximal ends of said at least two operating arms being received interior of the respective guideways.

6. The windscreen assembly of claim 5, wherein each of the linear guideways is a rail.

7. The windscreen assembly of claim 1, wherein the support panel is nested in said main panel and adapted to be a fairing at the front part of the motorcycle.

8. The windscreen assembly of claim 1, wherein said at least one supporting panel comprising a plurality of supporting panels nested to each other and to said main panel.

9. The windscreen assembly of claim 1, wherein each of said at least one pair of operating arms is pivotable.

10. The windscreen assembly of claim 1, further comprising:
    a windscreen washer cooperative with said main panel.

* * * * *